(12) United States Patent
Kim

(10) Patent No.: US 7,641,159 B2
(45) Date of Patent: Jan. 5, 2010

(54) DISPLAY UNIT FOR VEHICLES EQUIPPED WITH REAR SEAT ENTERTAINMENT SYSTEM

(75) Inventor: Young Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 435 days.

(21) Appl. No.: 11/641,445

(22) Filed: Dec. 19, 2006

(65) Prior Publication Data

US 2008/0068848 A1  Mar. 20, 2008

(30) Foreign Application Priority Data

Sep. 14, 2006  (KR) ...................... 10-2006-0089095

(51) Int. Cl.
*F16M 11/04* (2006.01)
(52) U.S. Cl. .................................................. 248/176.3
(58) Field of Classification Search ................. 248/422, 248/175, 404, 405, 292.12
See application file for complete search history.

(56) References Cited

U.S. PATENT DOCUMENTS 5,362,144 A * 11/1994 Shioya et al. ............ 312/319.6

2005/0167560 A1 * 8/2005 Ikunami ................ 248/346.01

FOREIGN PATENT DOCUMENTS

| JP | 06-199186 | 7/1994 |
|---|---|---|
| JP | 08-337145 | 12/1996 |
| KR | 10-2000-0021447 | 4/2000 |

* cited by examiner

*Primary Examiner*—J. Allen Shriver, II
*Assistant Examiner*—Erin Smith
(74) *Attorney, Agent, or Firm*—Morgan, Lewis & Bockius LLP

(57) ABSTRACT

A display unit for vehicles equipped with a rear seat entertainment (RSE) system includes: a monitor foldably mounted to an upper portion of a console box and configured to pivot about a hinge shaft; a monitor base having a fixing button mounted thereon so as to allow the monitor to pivot to open and closed positions; a return spring mounted around the hinge shaft; a gear box mounted such that a front portion thereof is directed toward a rear portion of the console box, the gear box being connected at an upper end portion thereof to a lower end portion of the monitor; a plurality of gears mounted inside the gear box in such a fashion as to engage with one another; and a vertical gear disposed vertically in the console box so as to engage with one of the plurality of gears.

7 Claims, 7 Drawing Sheets

DISPLAY UNIT FOR VEHICLES EQUIPPED WITH REAR SEAT ENTERTAINMENT SYSTEM

CROSS-REFERENCE TO RELATED APPLICATIONS

This application claims the benefit under 35 U.S.C. §119(a) of Korean Patent Application No. 10-2006-089095, filed in the Korean Intellectual Property Office on Sep. 14, 2006, the entire disclosure of which is incorporated herein by reference.

BACKGROUND OF THE INVENTION

1. Field of the Invention

The present invention relates to a display unit for vehicles equipped with a rear seat entertainment (RSE) system, and more particularly, to such a display unit for vehicles, in which a spring and a gear set are mounted to a hinge section of a monitor, and the gear set is engaged with a vertical gear disposed vertically in a console box, so that the monitor in a folded state is automatically opened upwardly while pivotally rotating about a hinge shaft to thereby improve a shortcoming of the monitor mounted to the console box and prevent injuries of rear seat passengers in collisions.

2. Background of the Related Art

Recently, various video and audio devices are being provided in vehicles Particularly in recreational vehicles (RVs), a rear seat entertainment ("RSE") system is usually provided so that the driver and passengers can play computer games, watch DVDs, etc., as well as listen to music. Such an RSE system typically includes a monitor, a DVD player, a TV tuner, a wireless audio transmitter, headphone receivers, etc. Display units are typically mounted to a roof panel or a seat console.

A roof panel-mounted type RSE system has an advantage in that rear seat passengers can watch the monitor in a comfortable posture, but disadvantages in that it is difficult to install its wiring and the inner space of the vehicle seems to be small. Further, when accidents occur, the passengers may be injured by the RSE system.

The seat console-mounted type RSE system has an advantage in that it is easy to install its wiring, and it employs a console box; therefore the inner space of the vehicle seems to be comparatively larger. However, the seat console is disposed at a low position, thus causing discomfort to passengers when watching the monitor.

Korean Patent Registration No. 194214 discloses an LCD mounting structure in which when a button is depressed, an LCD stands upright by means of a torsion spring mounted around a hinge shaft.

Korean Utility Model Laid-Open Publication No. Hei03-022951 discloses a structure in which when a locking means is released, an LCD is projected forward by means of an elastic means resiliently supporting a supporting means on which the LCD is provided.

However, the prior art structures as described above should be modified to adjust the height of the display unit using an elastic force of the torsion spring.

SUMMARY OF THE INVENTION

Exemplary embodiments of the present invention provide a display unit for vehicles equipped with a rear seat entertainment (RSE) system mounted to a console box, in which a return spring is installed at a hinge section of a monitor so that when a fixing unit is opened, the monitor automatically moves upward, and a gear set inside a gear box supporting the monitor is driven by means of a torque of a return spring which remains after lifting the monitor so as to cause the entire gear box to move upward along a vertical gear of the console box which is meshed with the gear set, thereby allowing rear seat passengers to watch the monitor in a comfortable posture, making it easy to install wiring, and preventing injuries to the rear seat passengers at the time of a vehicle collision.

Exemplary embodiments of the present invention provide a display unit for vehicles equipped with a rear seat entertainment (RSE) system, the display unit comprising: a monitor foldably mounted to an upper portion of a console box and configured to pivot about a hinge shaft; a monitor base having a fixing button mounted thereon so as to allow the monitor to pivot to open and closed positions; a return spring mounted around the hinge shaft; a gear box mounted such that a front portion thereof is directed toward a rear portion of the console box, the gear box being connected at an upper end portion thereof to a lower end portion of the monitor; a plurality of gears mounted inside the gear box in such a fashion as to engage with one another; and a vertical gear disposed vertically in the console box so as to engage with one of the plurality of gears.

When the fixing button is depressed, the monitor pivots forward to the open position by means of the return spring, and simultaneously the gear engaged with the vertical gear vertically moves along the vertical gear while rotating to cause the gear box and the monitor to be lifted, thereby allowing rear seat passengers to watch the monitor.

In some embodiments, the return spring is a "V"-shaped coil spring, coupled at a first end to the lower end portion of the monitor, and coupled at a second end to the gear box. A middle portion is disposed around the hinge shaft.

In some embodiments, the plural gears mounted inside the gear box may include a first gear mounted around the hinge shaft, a second gear engaged with the first gear, and a third gear engaged with the second gear, the third gear being engaged with the vertical gear of the console box so as to be moved vertically.

In some embodiments, a rear portion of the gear box has an inclined face.

In some embodiments, the display unit further comprises a return means mounted to a bottom portion of the monitor base so as to move forward and rearward while being moved vertically along the inclined face of the gear box so that when the monitor pivots toward the closed position, an applied pressure is reduced.

In some embodiments, the return means comprises a spring support mounted to a bottom surface of the monitor base, a guide rod horizontally disposed penetrating through the inside of the spring support so as to be movable in the forward and rearward directions, a fixture fixedly mounted on the guide rod in such a fashion as to be spaced apart from the spring support, a first compression spring fit around the guide rod between the spring support and the fixture, and a roller mounted to a distal end of the guide rod so as to be in roll-contact with the inclined face of the gear box, whereby when the gear box is moved upwardly with the monitor pivoting forward toward the open position, the guide rod moves rearwardly by means of the roller in roll-contact with the inclined face of the gear box and the compression spring is compressed so that when the monitor pivots toward the closed position, a necessary applied pressure is reduced by means of an elastic force of the first compression spring.

In some embodiments, a second compression spring is mounted to the bottom surface of the gear box and kept at a compressed state before the monitor pivots toward the open position to cause the gear box to be lifted, and increases an ascending force of the gear box by means of the elastic force thereof when the monitor pivots toward the open position.

In some embodiments, the third gear is axially connected to a drive motor so as to allow the monitor to pivot automatically.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiment of the present invention with reference to the attached drawings.

Figure 1:
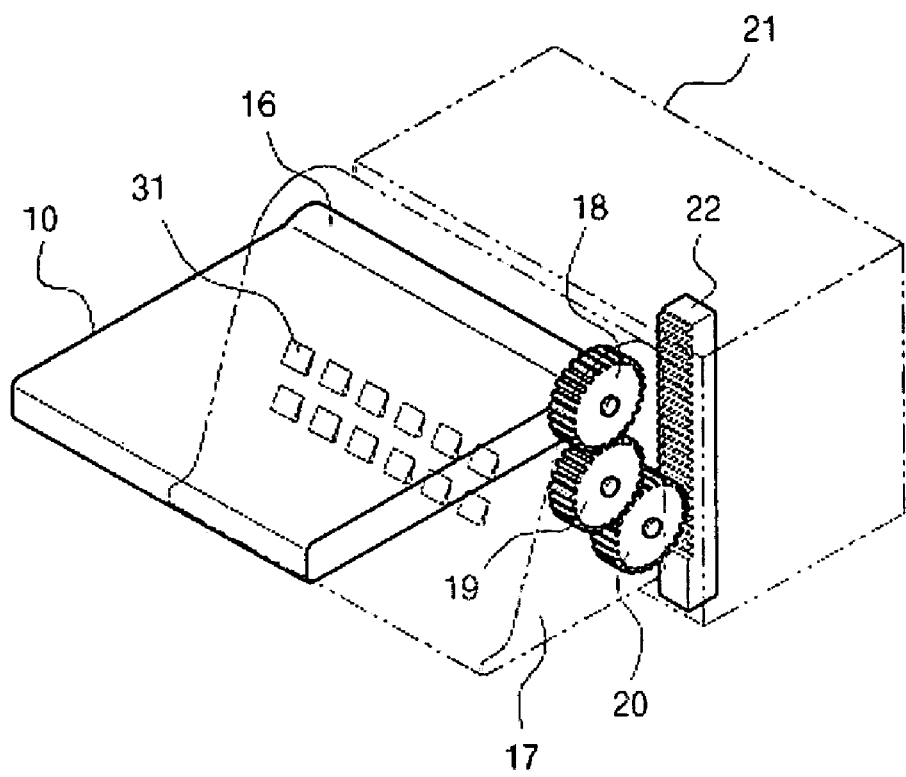
FIG. 1 is a perspective view illustrating a display unit for vehicles equipped with a rear seat entertainment (RSE) system according to one embodiment of the present invention in a state in which the monitor is not used.
Figure 2:
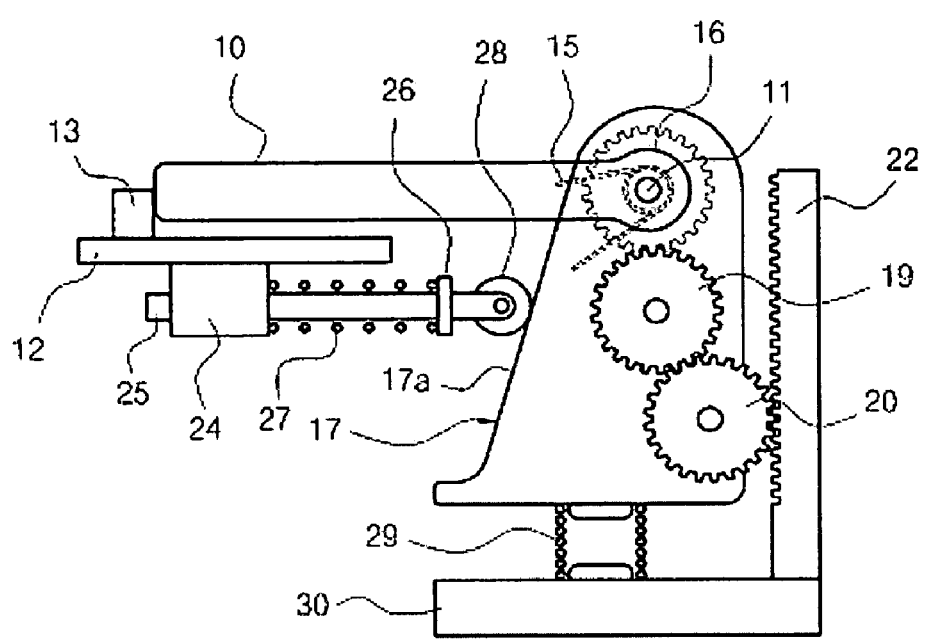
FIG. 2 is a side view illustrating the inner construction of FIG. 1.
Figure 4:
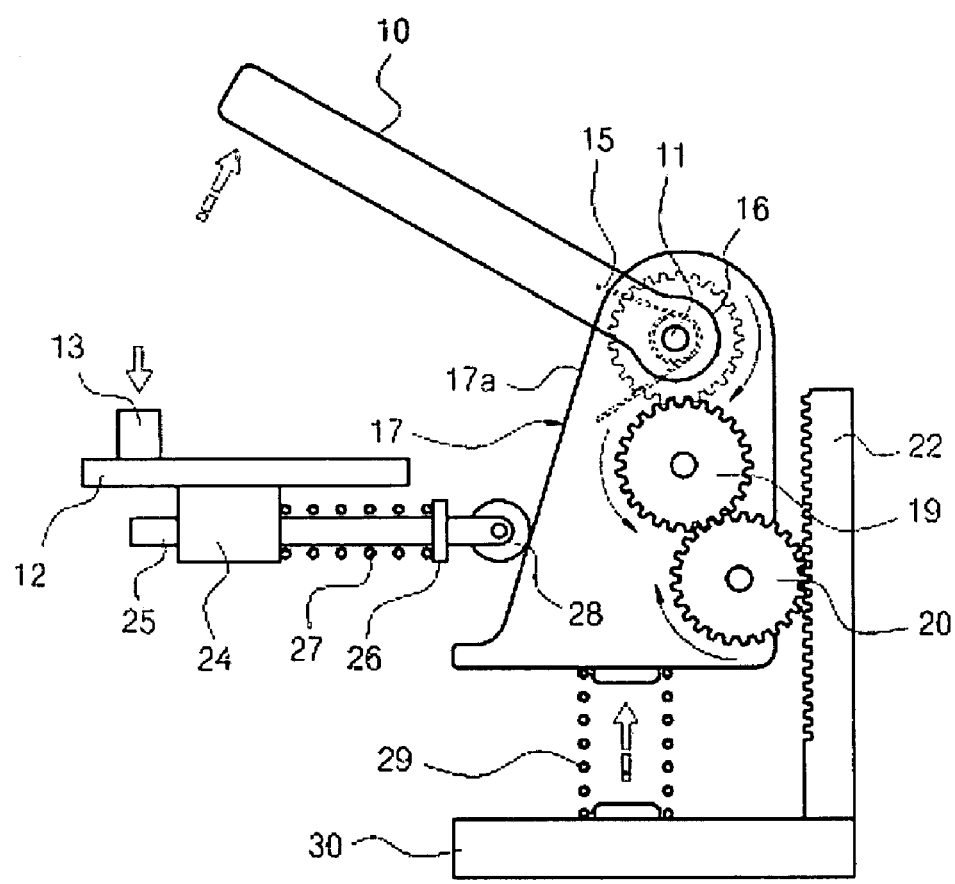
FIG. 4 is a side view illustrating the inner construction of FIG. 3.
Figure 5:
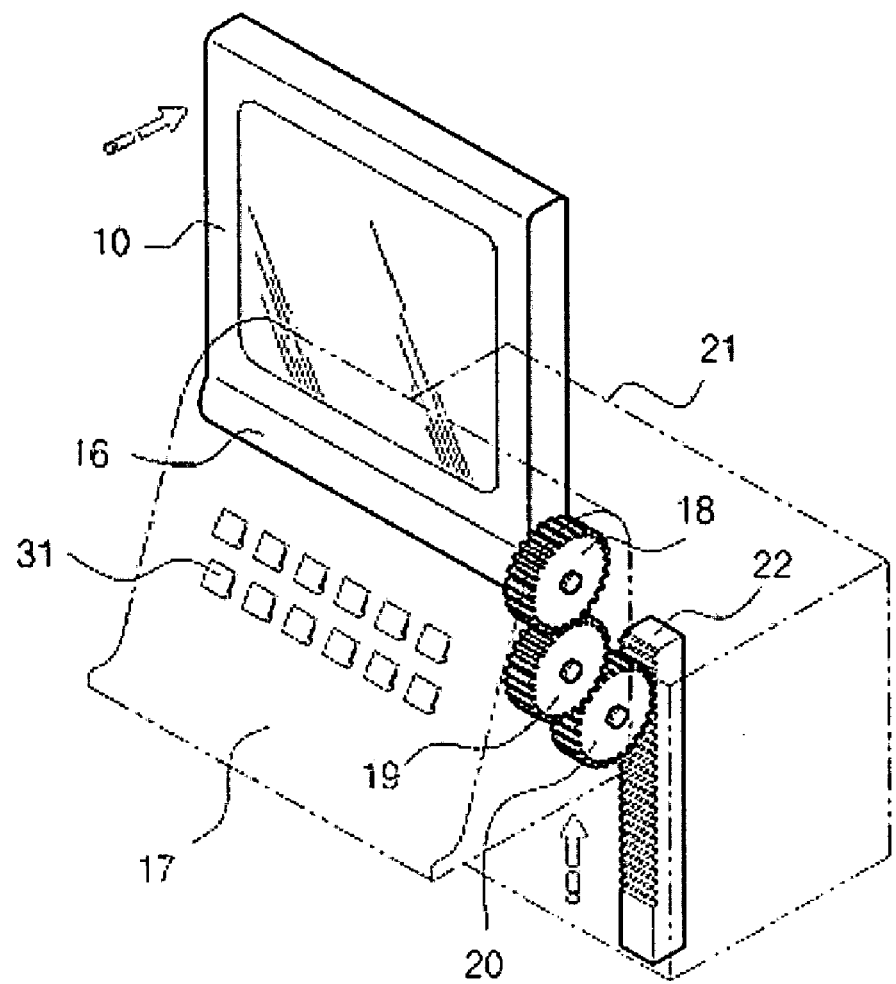
FIG. 5 is a perspective view of the display unit of FIG. 1 in a state in which the monitor is pivoted forward by 90 degrees to the open position.
Figure 6:
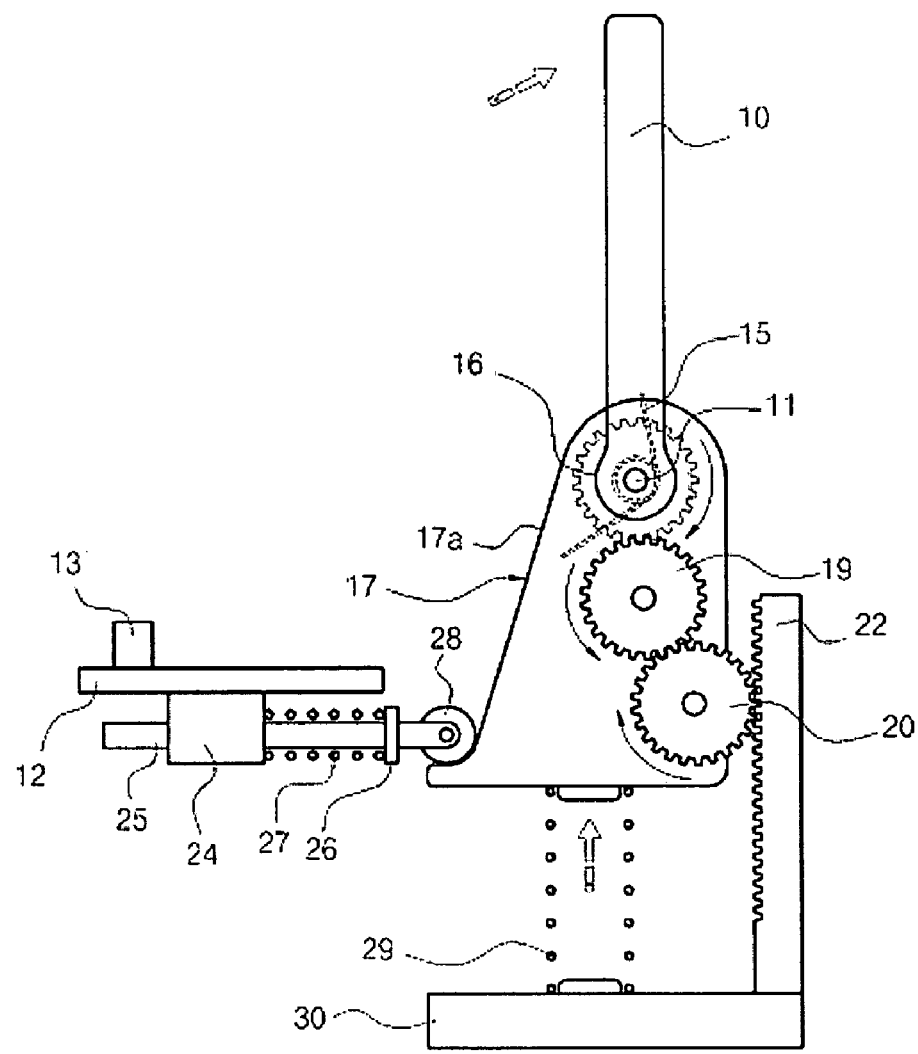
FIG. 6 is a side view illustrating the inner construction of FIG. 5.
Figure 7:
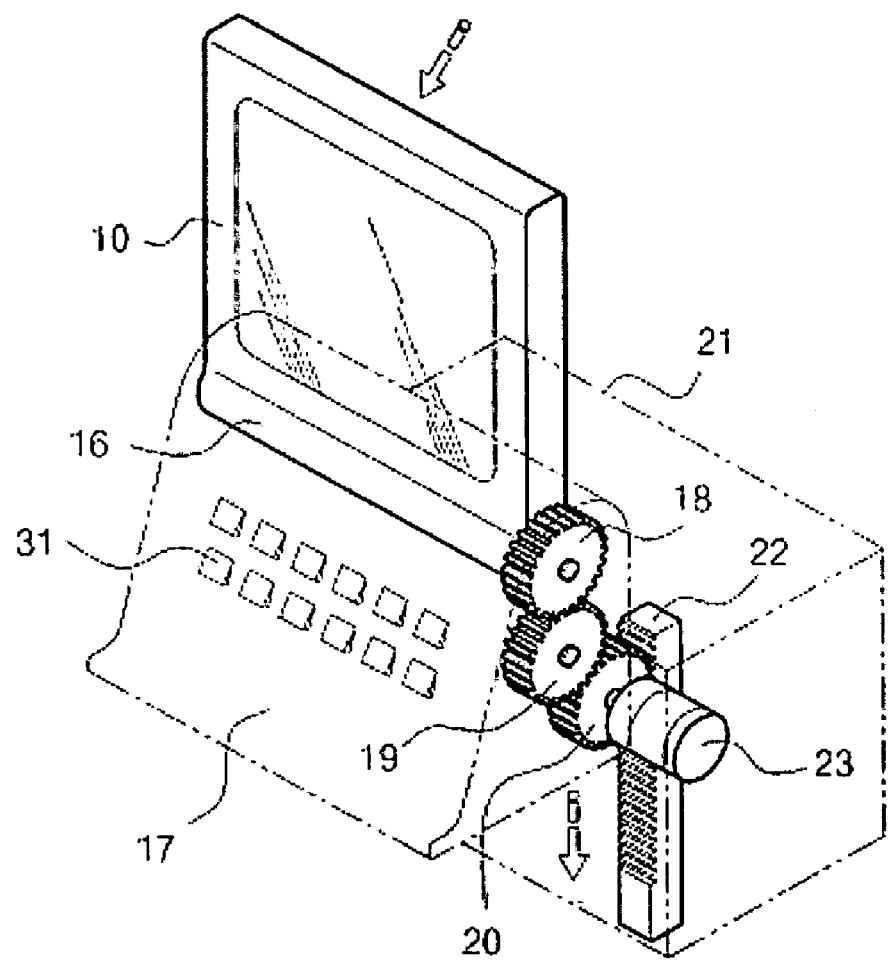
FIG. 7 is a perspective view illustrating the connection of a drive motor to a gear of the display unit of FIG. 1.

A lower end portion of a monitor 10 of the RSE system mounted to the seat console is hingeably coupled to a hinge shaft 11 (FIGS. 2, 4, and 6), so that the monitor 10 can pivot between an open position, as seen in FIGS. 5 and 6, and a closed position, as seen in FIGS. 1 and 2. A fixing button 13 is mounted on a top surface of one side of a monitor base 12 to allow the monitor 10 to be pivotally opened or closed.

A return spring 15 and a gear set 18, 19, 20, 22 are provided so that once the fixing button 13 is depressed, the monitor 10 pivots forwards and simultaneously moves upward.

The return spring 15 is mounted at a hinge section 16 formed at a lower end portion of the monitor 10. The return spring 15 is a "V"-shaped coil spring and its central lower end portion is formed in a spirally twisted structure to have elasticity with respect to the rotation direction of the monitor. The return spring 15 is fixedly coupled at one end to the lower end portion of the monitor 10 and is fixedly coupled at the other end to the inside wall of the gear box 17. When the monitor 10 pivots toward the closed position, the return spring 15 is compressed to bias the monitor 10 in the opposite direction.

A gear box 17 is mounted at the hinge section 16 of the monitor 10, and plural gears 18, 19 and 20 are mounted inside the gear box 17 so as to mesh with one another. A first gear 18 is mounted on the hinge shaft 11 and second and third gears 19 and 20 are meshed with a lower portion of the first gear 18 and with each other.

An intermediate portion of the return spring 15 is disposed inside the first gear 18, and the first gear 18 rotates by a torque generated from the return spring 15 such that when the monitor 10 rotates toward the open position (clockwise in the FIGs.), the first gear 18 also rotates towards the open position. The second gear 19 rotates in an opposite direction to the first gear 18, and the third gear 20 rotates in the same direction as the first gear 18.

A vertical gear 22, such as a rack gear, is disposed on a vertical plane of a console box 21 adjacent to and meshed with the third gear 20 so that the third gear 20 moves up and down along the vertical gear 22.

When the first to third gears 18 to 20 move upward along the vertical gear 22, the gear box 17 and the monitor 10 are lifted.

In addition, a drive motor 23 is axially coupled to the third gear 20 so that a user need not fold the monitor 10 manually, but the monitor pivots automatically.

A spring support 24 is protrudingly mounted to a bottom surface of the monitor base 12, and has a through-hole formed therein so as to allow a guide rod 25 to pass therethrough. A fixture 26 is mounted on the guide rod 25 and is spaced apart from the spring support 24.

A first compression spring 27 is fit around the guide rod 25 between the spring support 24 and the fixture 26. A roller 28 is mounted to a front distal end of the guide rod 25 so as to be vertically moved along an inclined face 17a of the gear box 17. When the roller 28 moves downward along the inclined face 17a as the gear box 17 is lifted, a distance between the spring support 24 and the fixture 26 decreases, causing the first compression spring 27 to be compressed. Of course, when the roller 28 moves upward along the inclined face 17a, the distance between the spring support 24 and the fixture 26 increases, causing the first compression spring 27 to return to its original state.

A second compression spring 29 on the bottom surface of the gear box 17 elastically supports the gear box 17 and is secured at a lower end portion thereof to the top surface of a floor panel 30. A key pad 31 (FIGS. 1, 3, 5, and 7) is provided on the inclined face 17a of the gear box 17.

The operation of the display unit described above will now be described.

(1) Prior to the use of the RSE (Referring to FIGS. 1 and 2)

The monitor 10 is fixed in the closed, horizontal position by means of the fixing button 13. The third gear 20 of the gear box 17 is meshed with the vertical gear 22 of the console box 21. The first compression spring 27 and the second spring 29 do not generate compression forces. The return spring 15 generates a torque.

Figure 3:
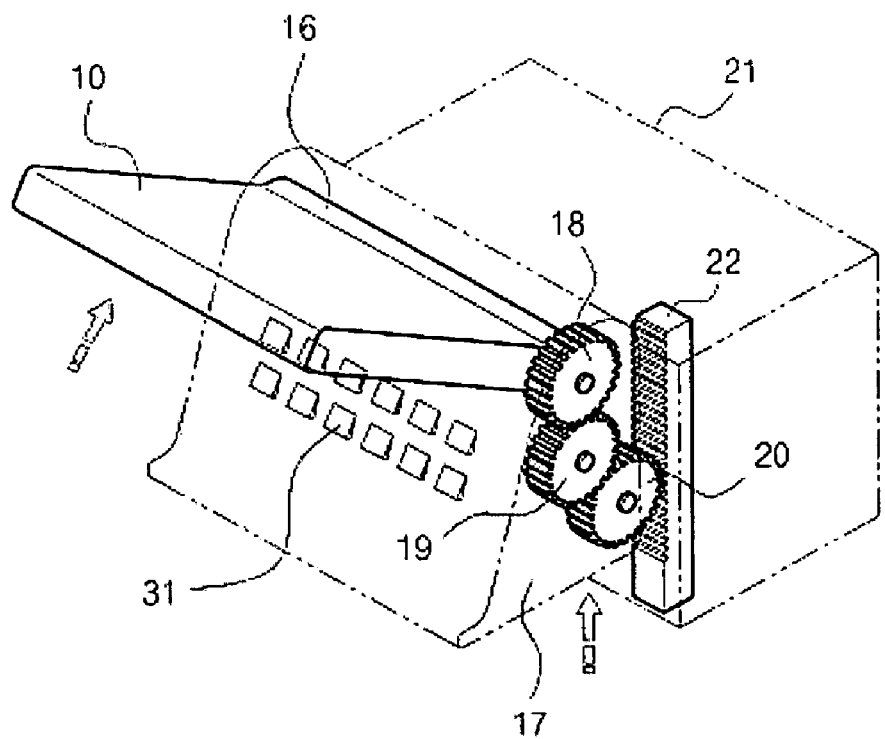
FIG. 3 is a perspective view of the display unit of FIG. 1 in a state in which the monitor is pivoted forward toward the open position by 30 degrees.

(2) During the use of the RSE (rotation by 30 degrees, referring to FIGS. 3 and 4)

When a user depresses the fixing button 13, the locked state of the monitor 10 is released and the monitor 10 pivots forward by means of the torque of the return spring 15. Simultaneously, the first gear 18 rotates in a clockwise direction in the FIGs, and the third gear 20 rotates in a clockwise direction by means of the counterclockwise rotation of the second gear 19 so that the gear box 17 and the monitor 10 are lifted.

The elastic force of the second compression spring 29 compressed by the gear box 17 helps to ascend the gear box 17.

(3) During the use of the RSE (rotation by 90 degrees, see FIGS. 5 and 6)

When the monitor 10 rotates by 90 degrees, it is positioned at the highest point. At this time, as the gear box 17 is moved upwardly, the roller 28 is relatively positioned at a lower position of the inclined face 17a of the gear box 17. Then, as the guide rod 25 is moved rearwardly with the spring support 24 of the monitor base 12 fixed in position, the first compression spring 27 is compressed.

In case of not using the RSE, since the elastic force of the compressed first compression spring 27 decreases an applied pressure when closing the monitor 10, it is easy to pivotally close the monitor.

While the present invention has been described with reference to the particular illustrative embodiments, it is not to be restricted by the embodiments, but only by the appended claims. It is to be appreciated that those skilled in the art can change or modify the embodiments without departing from the scope and spirit of the present invention.

What is claimed is:

1. A display unit disposed on a console box, comprising:
   a monitor pivotally mounted about a hinge shaft;
   a monitor base comprising a button;
   a return spring mounted around the hinge shaft;
   a gear box mounted such that a front portion thereof is directed toward a rear portion of the console box, the gear box being connected to the monitor;
   a plurality of gears mounted inside the gear box and engaged with one another; and
   a vertical gear disposed substantially vertically and engaged with one of the plurality of gears,
   whereby when the button is depressed, the monitor pivots toward an open position by means of the return spring, and the gear engaged with the vertical gear moves substantially vertically along the vertical gear while rotating, such that the gear box and the monitor are lifted;
   wherein the return spring is a "V"-shaped coil spring, is coupled at a first end thereof to the lower end portion of the monitor and coupled at a second end thereof to the gear box, and comprises a middle portion disposed around the hinge shaft.

2. A display unit disposed on a console box, comprising:
   a monitor pivotally mounted about a hinge shaft;
   a monitor base comprising a button;
   a return spring mounted around the hinge shaft;
   a gear box mounted such that a front portion thereof is directed toward a rear portion of the console box, the gear box being connected to the monitor;
   a plurality of gears mounted inside the gear box and engaged with one another; and
   a vertical gear disposed substantially vertically and engaged with one of the plurality of gears,
   whereby when the button is depressed, the monitor pivots toward an open position by means of the return spring, and the gear engaged with the vertical gear moves substantially vertically along the vertical gear while rotating, such that the gear box and the monitor are lifted;
   wherein the plurality of gears comprises a first gear mounted around the hinge shaft, a second gear engaged with the first gear, and a third gear engaged with the second gear and with the vertical gear.

3. The display unit as set forth in claim 2, wherein a rear portion of the gear box comprises an inclined face.

4. The display unit as set forth in claim 3, wherein the display unit further comprises a return means mounted to a bottom portion of the monitor base to move forward and rearward while moving along the inclined face of the gear box.

5. The display unit as set forth in claim 4, wherein the return means comprises:
   a spring support mounted to a bottom surface of the monitor base;
   a guide rod disposed through the spring support and forwardly and rearwardly movable;
   a fixture mounted on the guide rod and spaced apart from the spring support;
   a compression spring disposed around the guide rod between the spring support and the fixture; and
   a roller mounted to an end of the guide rod so as to be in roll-contact with the inclined face of the gear box;
   whereby when the gear box moves upward, the guide rod moves rearward by means of the roller in roll-contact with the inclined face of the gear box and the compression spring is compressed so that when the monitor pivots toward a closed position, an applied pressure is reduced by means of an elastic force of the compression spring.

6. A display unit disposed on a console box, comprising:
   a monitor pivotally mounted about a hinge shaft;
   a monitor base comprising a button;
   a return spring mounted around the hinge shaft;
   a gear box mounted such that a front portion thereof is directed toward a rear portion of the console box, the gear box being connected to the monitor;
   a plurality of gears mounted inside the gear box and engaged with one another; and
   a vertical gear disposed substantially vertically and engaged with one of the plurality of gears,
   whereby when the button is depressed, the monitor pivots toward an open position by means of the return spring, and the gear engaged with the vertical gear moves substantially vertically along the vertical gear while rotating, such that the gear box and the monitor are lifted;
   further comprising a compression spring mounted to a bottom surface of the gear box and kept at a compressed state before the monitor pivots toward an open position to cause the gear box to be lifted, and increases an ascending force of the gear box by means of an elastic force thereof when the monitor pivots toward the open position.

7. The display unit as set forth in claim 2, wherein the third gear is axially connected to a drive motor that pivots the monitor.

* * * * *